US009445186B2

United States Patent
Zheng et al.

(10) Patent No.: US 9,445,186 B2
(45) Date of Patent: Sep. 13, 2016

(54) ELECTROLUMINESCENT EARPHONE WITH BENDING-RESISTANCE AND HIGH-BRIGHTNESS

(71) Applicant: Shanghai Kerun Phosphor Technology Co., Ltd., Shanghai (CN)

(72) Inventors: Yan Zheng, Shanghai (CN); Lei Chen, Shanghai (CN); Suwen Guo, Shanghai (CN); Lihua Quan, Shanghai (CN); Yun Jiang, Shanghai (CN); Jinshui Zhou, Shanghai (CN); Lijian Meng, Shanghai (CN); Zheng Xu, Shanghai (CN); Suling Zhao, Shanghai (CN)

(73) Assignee: Shanghai Kerun Phosphor Technology Co., Ltd., Shanghai (CN)

( * ) Notice: Subject to any disclaimer, the term of this patent is extended or adjusted under 35 U.S.C. 154(b) by 0 days.

(21) Appl. No.: 14/793,619

(22) Filed: Jul. 7, 2015

(65) Prior Publication Data
US 2015/0326964 A1 Nov. 12, 2015

(30) Foreign Application Priority Data

Feb. 2, 2015 (CN) .................... 2015 2 0072097 U

(51) Int. Cl.
*H04R 1/10* (2006.01)
*F21V 33/00* (2006.01)
*H05B 33/08* (2006.01)
*H05B 37/02* (2006.01)
*C09K 11/65* (2006.01)
*H05B 33/14* (2006.01)
*F21Y 103/00* (2016.01)

(52) U.S. Cl.
CPC ............ *H04R 1/1091* (2013.01); *C09K 11/65* (2013.01); *F21V 33/0056* (2013.01); *H04R 1/1025* (2013.01); *H05B 33/08* (2013.01); *H05B 33/14* (2013.01); *H05B 37/0236* (2013.01); *F21Y 2103/006* (2013.01); *H04R 1/1041* (2013.01)

(58) Field of Classification Search
None
See application file for complete search history.

(56) References Cited

U.S. PATENT DOCUMENTS

| 7,319,762 | B2 * | 1/2008 | Andrea | H04R 1/1041 340/815.46 |
| 8,509,453 | B2 * | 8/2013 | Bychkov | H04R 1/1033 381/74 |
| 2007/0019821 | A1 * | 1/2007 | Dudley | H04R 1/1033 381/77 |
| 2007/0081690 | A1 * | 4/2007 | Stagni | H04R 1/028 381/384 |
| 2008/0265767 | A1 * | 10/2008 | Baumberg | C09K 11/584 313/511 |
| 2015/0092955 | A1 * | 4/2015 | Jiang | H04R 1/10 381/74 |
| 2015/0373449 | A1 * | 12/2015 | Jackson | H04R 1/1033 381/74 |

* cited by examiner

Primary Examiner — Paul Huber

(57) ABSTRACT

An electroluminescent earphone with a bending-resistance and a high-brightness includes earphone wires having bending-resistant electroluminescent wires, earbuds, an electroluminescent wire driver and an audio inputting plug. Each bending-resistant electroluminescent wire includes: a plurality of central electrodes; a luminescent layer coated on outer surfaces of the central electrodes; a transparent conductive layer coated on an outer surface of the luminescent layer; an outer electrode made of a plurality of wires arranged on an outer surface of the transparent conductive layer; and a transparent plastic covering the outer electrode and the transparent conductive layer. The bending-resistant electroluminescent wire is parallel with an earphone audio wire or coils around an outer surface of the earphone audio wire. A colored transparent plastic covers the bending-resistant electroluminescent wire and the earphone audio wire to form the earphone wire having the bending-resistant electroluminescent wire.

4 Claims, 2 Drawing Sheets

ELECTROLUMINESCENT EARPHONE WITH BENDING-RESISTANCE AND HIGH-BRIGHTNESS

CROSS REFERENCE OF RELATED APPLICATION

The present invention claims priority under 35 U.S.C. 119(a-d) to CN 201520072097.7, filed Feb. 2, 2015.

BACKGROUND OF THE PRESENT INVENTION

1. Field of Invention

The present invention belongs to an applied technology field of consumer electronic luminescent devices.

2. Description of Related Arts

The music earphones are the common accessories of the conventional consumer electronic devices, such as the mobile phones and the audio equipments. The music earphones are widely applied in answering the mobile phones, the computers, the MP3, the MP4 and the radios. The conventional luminescent earphones mainly depend on the LEDs with the variable colors. The luminescent earphone wires conduct and emit light through the optical fibers in the earphone wires. Because the optical fiber transmission has a large optical loss, the front end and the back end of the earphone wires have different brightness. Because the conventional luminescent earphones mostly adopt the electroluminescent wires with the single-cored inner electrodes or the single-cored outer electrodes, the conventional luminescent earphones are unable to endure the repeated bending. The repeated bending leads to the broken inner electrode or the broken outer electrode, which disenables the electroluminescent wires to emit light. Or, the thick luminescent layer and the thick luminescent medium lead to a high threshold voltage, a low brightness and a poor durability of the organic dye for emitting white light. Accordingly, the luminescent layer is liable to fall off and be broken after bending. The detailed technical solutions of the above conventional luminescent earphones are described in the Chinese patent application of ZL200320117930.2, ZL200620014022.4 and ZL201310594626.5 and the US patent publication of U.S. Pat. No. 8,509,453.

The electroluminescent wires are also called flexible neon wires, luminescent wires and EL wires. The electroluminescent wires emit light through the electric fields. The electroluminescent wires are mainly applied in the field of the luminescent display lighting. The electroluminescent wires have the similar appearance with the common telephone wires. When working, the electroluminescent wires are able to emit light continuously without generating the thermal radiation. The electroluminescent wires save energy and have a low electricity consumption. The electroluminescent wires are flexible, foldable and bendable, and able to be randomly knotted, cut and jointed. Thus, the electroluminescent wires are widely applied and able to generate a music luminescent effect in combination with the functional audio wires.

The present invention provides an electroluminescent earphone with a bending-resistance and a high-brightness. The electroluminescent earphone comprises earphone wires having bending-resistant electroluminescent wires, earbuds, an electroluminescent wire driver and an audio inputting plug. Each bending-resistant electroluminescent wire comprises: a plurality of central electrodes, wherein the central electrodes are made of enameled copper wires; a luminescent layer coated on outer surfaces of the central electrodes; a fluorescent carbon quantum dot layer and a transparent conductive layer which are coated on an outer surface of the luminescent layer; an outer electrode formed by a plurality of copper wires, arranged on an outer surface of the transparent conductive layer; and a transparent plastic covering the outer electrode and the transparent conductive layer. The bending-resistant electroluminescent wire is parallel with an earphone audio wire or coils around an outer surface of the earphone audio wire. A colored transparent plastic covers the bending-resistant electroluminescent wire and the earphone audio wire to form the earphone wire having the bending-resistant electroluminescent wire. The electroluminescent wire driver is independent of the earphone audio wire or combined with the earphone audio wire to control the bending-resistant electroluminescent wire to flash. The electroluminescent wire driver comprises an inductive driver which has an outputting voltage of 50-200V and a frequency of 400-6000 Hz. An output of the inductive driver is controlled by multiple channels or a single channel. The inductive driver is connected with the bending-resistant electroluminescent wires. The inductive driver adjusts a luminescent intensity and a flashing speed of the bending-resistant electroluminescent wires according to an earphone audio signal.

The present invention is applicable in various fields of the mobile phones, the audio equipments, the luminescent wires of the household appliances, the USB data wires, the dynamic advertisements, the electronic devices, the luminescent wires, the performance costumes, the direction safety signs and the automotive wires.

SUMMARY OF THE PRESENT INVENTION

The present invention provides an electroluminescent earphone with a bending-resistance and a high-brightness, comprising: first earphone wires having bending-resistant electroluminescent wires, a second earphone wire having the bending-resistant electroluminescent wire, earbuds, an electroluminescent wire driver and an audio inputting plug. Each bending-resistant electroluminescent wire comprises a plurality of central electrodes which are made of enameled copper wires. The copper wires have a good conductivity; the central electrodes can be made of other highly conductive materials, such as metals, materials having a metallic conductivity, metallic oxides, conductive polymers and graphite. The bending-resistant electroluminescent wire further comprises: a luminescent layer coated on outer surfaces of the central electrodes; a fluorescent carbon quantum dot layer coated on an outer surface of the luminescent layer; and a transparent conductive layer coated on an outer surface of the fluorescent carbon quantum dot layer. The transparent conductive layer and the fluorescent carbon quantum dot layer are thin, usually having a thickness of smaller than 100 nm, and thus are invisible to naked eyes. The bending-resistant electroluminescent wire further comprises: an outer electrode made of a plurality of the copper wires, arranged on an outer surface of the transparent conductive layer. The outer electrode can be made of other highly conductive materials, such as the metals, the materials having the metallic conductivity, the metallic oxides and the conductive polymers. The bending-resistant electroluminescent wire further comprises a transparent plastic covering the outer electrode and the transparent conductive layer. The transparent plastic has an insulation protection effect. The bending-resistant electroluminescent wire is parallel with an earphone audio wire or coils around an outer surface of the earphone audio wire. A colored transparent plastic covers the bending-resistant electroluminescent wire and the earphone audio wire to form the earphone wire having the bending-resistant electroluminescent wire. The electroluminescent wire driver is independent of the earphone audio wire or combined with the earphone audio wire to control the bending-resistant electroluminescent wire to flash.

According to the present invention, insulation varnish of the enameled copper wires is a conventional polyurethanes material. The insulation varnish is coated on a surface of each copper wire, and then the coated copper wires are woven and twisted. Alternatively, the copper wires are firstly woven and twisted, and then coated by the insulation varnish, and then the insulation varnish forms an insulation varnish layer. It is beneficial for a drive operation of an inductive driver to avoid using high dielectric constant materials, which further increases brightness, decreases power loss, prevents the inductive driver from being hot due to a long-time operation and reduces a volume of the inductive driver.

The electroluminescent wire driver comprises the inductive driver which has an outputting voltage of 50-200V and a frequency of 400-6000 Hz. An output of the inductive driver is controlled by multiple channels or a single channel. The inductive driver is connected with the bending-resistant electroluminescent wires. The inductive driver adjusts a luminescent intensity and a flashing speed of the bending-resistant electroluminescent wires according to an earphone audio signal. According to the present invention, the inductive driver runs without generating noise, so as to avoid an audio quality problem caused by noise of a high-frequency transformer.

The fluorescent carbon quantum dot layer is made of a fluorescent nano material containing carbon. The fluorescent carbon quantum dot layer has a light absorption range of 365-520 nm and a light emission range of 440-610 nm. The fluorescent carbon quantum dot layer is able to convert a luminescent spectrum of the luminescent layer into white light. The white light generated by the fluorescent carbon quantum dot layer enhances colored fluorescence of the colored transparent plastic. According to the present invention, the fluorescent nano material is different from conventional organic fluorescent dye. The conventional organic fluorescent dye is unstable and unable to work steadily under ultraviolet rays or a wet condition. Additionally, conventional yttrium aluminum garnet (YAG) materials affect brightness of the bending-resistant electroluminescent wires. The fluorescent carbon quantum dot layer is located between the luminescent layer and the transparent conductive layer. The fluorescent carbon quantum dot layer is thin and semi-conductive, and thus avoids affecting transparent conductive materials of the transparent conductive layer and the brightness. Alternatively, the fluorescent carbon quantum dot layer is coated on the outer surface of the transparent conductive materials of the transparent conductive layer, without affecting a conversion into the white light.

According to the present invention, the audio inputting plug is connected with the electroluminescent wire driver 8 through the second earphone wire having the bending-resistant electroluminescent wire. The earbuds are connected with the electroluminescent wire driver through the first earphone wires having the bending-resistant electroluminescent wires. Each of the first earphone wires and the second earphone wire can be embodied as the bending-resistant electroluminescent wire with a single color, a plurality of the bending-resistant electroluminescent wires with the single color, or the plurality of the bending-resistant electroluminescent wires with multiple colors. The luminescent layer of the bending-resistant electroluminescent wire is a combination of electroluminescent fluorescent materials and fluorescent carbon quantum dots. The electroluminescent wire driver controls the bending-resistant electroluminescent wires to flash according to an audio. The colored transparent plastic is for controlling the color of the bending-resistant electroluminescent wire.

The electroluminescent wire driver comprises an inductor, a micro charging battery and an inductor-exclusive driving control circuit. An anti-interferential shielding reflection layer is arranged outside the earphone audio wire. The micro charging battery is charged by a mobile phone or a USB interface power supply. The electroluminescent wire driver of the present invention comprises the micro charging battery and the exclusive driving control circuit. The anti-interferential shielding reflection layer is arranged outside the earphone audio wire. The micro charging battery is charged by the mobile phone or the USB interface power supply. The electroluminescent wire driver controls the bending-resistant electroluminescent wires to flash according to the audio. The color of the bending-resistant electroluminescent wire is controlled by the colored transparent plastic. The audio inputting plug can be integrated into the electroluminescent wire driver 8, so as to simplify the electroluminescent earphone.

According to the present invention, the color of the bending-resistant electroluminescent wire is controlled by the colored transparent plastic. Colored organic fluorescent transparent dye is added into the transparent plastic and the colored transparent plastic, so as to enrich the color of the electroluminescent earphone. The white light generated by the fluorescent carbon quantum dot layer enhances the colored fluorescence of the colored transparent plastic and purifies the color. Thus, an impure color conversion caused by a conventional blue green electroluminescence is avoided and a production of the bending-resistant electroluminescent wire is simplified.

According to the present invention, the central electrodes, made of the enameled copper wires, and the outer electrode, made of the copper wires, have a good tensile resistance and a good bending resistance.

These and other objectives, features, and advantages of the present invention will become apparent from the following detailed description, the accompanying drawings, and the appended claims.

In figures, 1: central electrode; 2: insulation varnish layer; 3: luminescent layer; 4: outer electrode; 5: transparent plastic; 6: earphone audio wire; 7: colored transparent plastic; 8: electroluminescent wire driver; 9: first earphone wire having bending-resistant electroluminescent wire; 10: second earphone wire having the bending-resistant electroluminescent wire; 11: earbuds; and 12: audio inputting plug.

DETAILED DESCRIPTION OF THE PREFERRED EMBODIMENT

Figure 1:
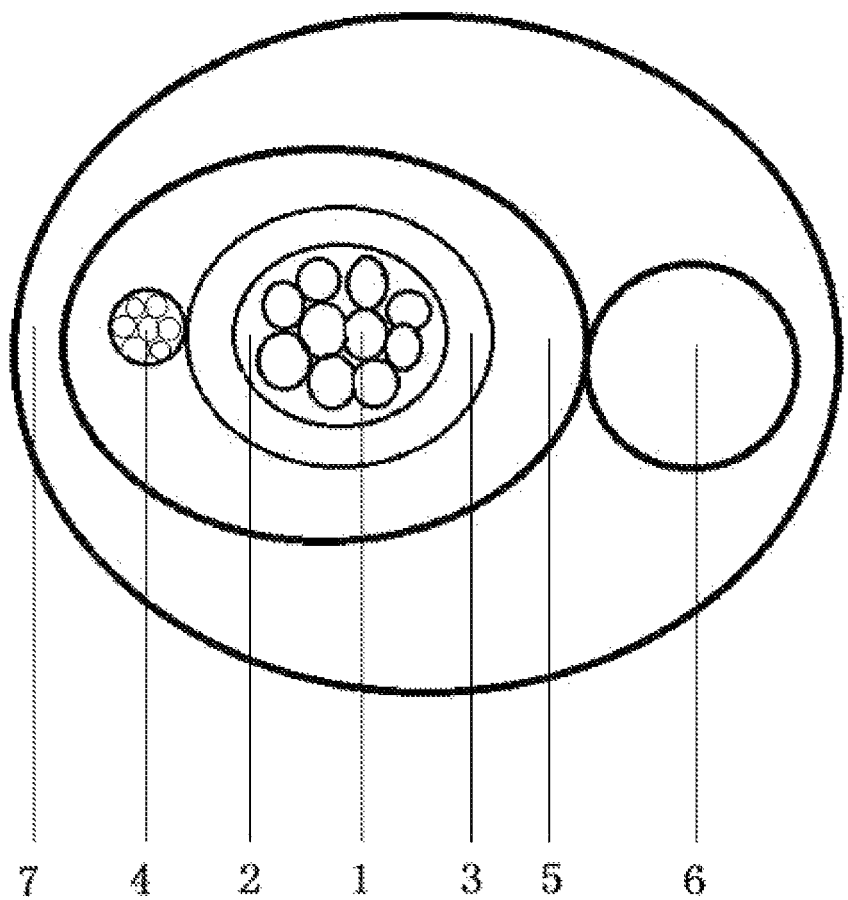
FIG. 1 is a structural view of an earphone wire of an electroluminescent earphone with a bending-resistance and a high-brightness according to a preferred embodiment of the present invention.
Figure 2:
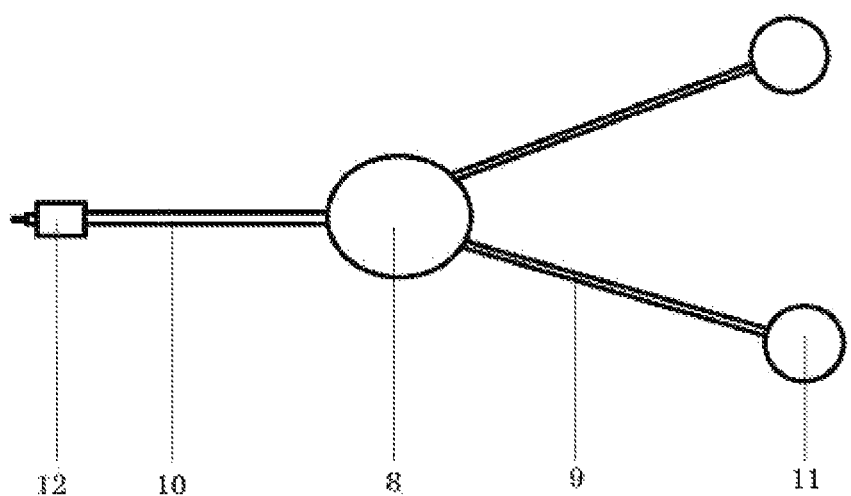
FIG. 2 is a structural view of the electroluminescent earphone according to the preferred embodiment of the present invention.

According to a preferred embodiment of the present invention, as showed in FIG. 1 and FIG. 2, an electroluminescent earphone with a bending-resistance and a high-brightness is provided, comprising: first earphone wires 9 having bending-resistant electroluminescent wires, a second earphone wire 10 having the bending-resistant electroluminescent wire; earbuds 11, an electroluminescent wire driver 8, and an audio inputting plug 12. Alternatively, one of the first earphone wires 9 and the second earphone wire 10 is replaced by a common earphone wire without light emission, so as to improve a luminescent efficiency of an irreplaced electroluminescent wire, or elongate the irreplaced electroluminescent wire, since the electroluminescent wire driver 8 has a limited power.

According to the preferred embodiment of the present invention, the bending-resistant electroluminescent wire comprises a plurality of central electrodes 1 which are made of enameled copper wires. The copper wires have a good conductivity. The central electrodes 1 can be made of other highly conductive materials, such as metals, materials having a metallic conductivity, metallic oxides, conductive polymers and graphite. The copper wires can be replaced by gold wires, silver wires and aluminum wires, but the copper wires are the most common. The copper wires can also be replaced by plastic lines coated by a conductive material. A luminescent layer 3 is directly coated on outer surfaces of the central electrodes 1, so as to directly increase a luminescent intensity. The luminescent layer 3 is made of an electroluminescent material, such as white D330C and blue D417B of KPT. The electroluminescent material, after mixing with an adhesive, is coated into the luminescent layer 3. A fluorescent carbon quantum dot layer is coated on an outer surface of the luminescent layer 3 and a transparent conductive layer is coated on an outer surface of the fluorescent carbon quantum dot layer. The transparent conductive layer and the fluorescent carbon quantum dot layer are thin, usually having a thickness of smaller than 100 nm, and thus are invisible to naked eyes. Each of the first earphone wires 9 and the second earphone wire 10 can be embodied as the bending-resistant electroluminescent wire with a single color, a plurality of the bending-resistant electroluminescent wires with the single color, or the plurality of the bending-resistant electroluminescent wires with multiple colors. The luminescent layer 3 of the bending-resistant electroluminescent wire is combined by electroluminescent fluorescent materials and fluorescent carbon quantum dots.

The fluorescent carbon quantum dot layer is formed by the fluorescent quantum carbon quantum dots of 5-20 nm. The fluorescent carbon quantum dots are obtained through microwaves or burning. The transparent conductive layer is made of a transparent conductive material, such as nano-silver, gold and indium tin oxide (ITO), or made of an organic polymer. An outer electrode 4 made of a plurality of wires is arranged on an outer surface of the transparent conductive layer. The outer electrode 4 is made of highly conductive materials, such as the metals, the materials having the metal conductivity, the metallic oxides and the conductive polymers. The wires can be the gold wires, the silver wires, the copper wires and the aluminum wires, but the copper wires are the most common. A transparent plastic 5 covers the outer electrode 4 and the transparent conductive layer to form the bending-resistant electroluminescent wire. The transparent plastic 5 has an insulation protection effect. The transparent plastic is polyvinyl chloride (PVC), polyethylene (PE), polypropylene (PP), fluoroplastic or silicone rubber. When an earphone audio wire 6 has an anti-interferential shielding reflection layer, the transparent plastic 5 is unnecessary. The bending-resistant electroluminescent wire is parallel with the earphone audio wire 6 or coils around an outer surface of the earphone audio wire 6. A colored transparent plastic 7 covers the bending-resistant electroluminescent wire and the earphone audio wire 6 to form the earphone wire having the bending-resistant electroluminescent wire. The colored transparent plastic 7 is the PVC, the PE, the PP, the fluoroplastic or the silicone rubber. Fluorescent pigments or fluorescent dyes are added into the colored transparent plastic 7 to improve a colorful effect. The electroluminescent wire driver 8 is independent of the earphone audio wire 6 or combined with the earphone audio wire 6 to control the bending-resistant electroluminescent wire to flash.

According to the preferred embodiment of the present invention, the audio inputting plug 12 is connected with the electroluminescent wire driver 8 through the second earphone wire 10 having the bending-resistant electroluminescent wire. Alternatively, the audio inputting plug 12 is connected with the electroluminescent wire driver 8 through the common earphone wire without light emission, so as to improve a length and a brightness of the first earphone wires 9. The earbuds 11 are connected with the electroluminescent wire driver 8 through the first earphone wires 9 having the bending-resistant electroluminescent wires. The electroluminescent wire driver 8, according to the audio, controls the bending-resistant electroluminescent wires to flash. The color of the bending-resistant electroluminescent wire is controlled by the colored transparent plastic 7 and is the same with the surface color of the colored transparent plastic 7. The electroluminescent wire driver 8 comprises an inductive driver, a micro charging battery and an exclusive driving control circuit. The inductive driver is able to increase the luminescent intensity and has a larger power than an inductor. The anti-interferential shielding reflection layer is arranged outside the earphone audio wire 6, so as to improve the brightness of the bending-resistant electroluminescent wire and a sound quality. The micro charging battery is charged by a mobile phone or a USB interface power supply. The micro charging battery guarantees that the electroluminescent earphone continuously emits light without an external power supply. The micro charging battery can be charged through a USB interface, a mobile phone charger, an automotive power supply and solar energy. Through using the micro charging battery, a battery consumption of the mobile phone is decreased and accordingly a longer communication time of the mobile phone is guaranteed.

According to the preferred embodiment of the present invention, the single bending-resistant electroluminescent wire or the multiple bending-resistant electroluminescent wires can spirally coil around the outer surface of the earphone audio wire 6. Alternatively, the bending-resistant electroluminescent wire, combining with a functional wire, spirally coils around the outer surface of the earphone audio wire 6. The earphone audio wire 6 and a data wire are covered by the anti-interferential shielding reflection layer. The bending-resistant electroluminescent wires have the single color or the multiple colors. The bending-resistant electroluminescent wires are able to flash one by one according to the requirements and thus have a directional scrolling effect. The bending-resistant electroluminescent wires are able to emit different colors according to different working conditions. The earphone audio wire 6 is able to be replaced by other functional wires or cables. The length of the earphone wires can be over 1000 m during production and using, and the earphone wires are applicable in route safety indications, communication and data transmission.

The present invention has following advantages.

Firstly, the earphone wires 9 and 10 provided by the present invention have a simple structure and a low cost. The earphone wires 9 and 10 have a dynamic light display when the mobile phone plays music, and serve as functional earphone wires at the same time. A structure of the outer electrode 4 and a structure of the central electrodes 1 provided by the present invention are improved. Thus, the earphone wires 9 and 10 are able to be bended for more than 10,000 times, while conventional luminescent earphone wires are merely able to be bended for about 300 times. Meanwhile, a medium layer of the luminescent layer is improved and a threshold voltage thereof is lowered to 40 V.

Secondly, the electroluminescent earphone provided by the present invention is energy-saving, environmental friendly, safe and beautiful. The earphone is applicable in safety indications of electronic devices and reminding users that the mobile phones are playing music. Because the transparent plastic layer is improved, the bending-resistant electroluminescent wires provided by the present invention are thinner and more flexible, and have a better bending-resistance. Because the bending-resistant electroluminescent wires have capacitive properties and the inductive driver improves the efficiency, an electrical energy consumption per unit volume is greatly decreased.

Thirdly, the electroluminescent earphone provided by the present invention adopts a white luminescent technology. Thus, the electroluminescent earphone has the simple structure, is suitable for a scale production, and has pure colors and a high yield. The length of each of the earphone wires can be over 1000 m. The electroluminescent earphone is applicable in fields of luminescent wires, luminescent data electronic wires, neon advertisements, fluorescent signs, luminescent clothes, luminescent bags, architectural ornaments, safety instruction lighting, automotive flashing products and night carry-on safety signs. Particularly, the electroluminescent earphone is able to support the mobile phones for safety indications at night. The luminescent earphone can be used alone, or combined with the mobile phones in accordance to the music, or combined with the mobile phones for reminding in-coming calls.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electroluminescent earphone with a bending-resistance and a high-brightness, comprising: earphone wires having bending-resistant electroluminescent wires, earbuds, an electroluminescent wire driver and an audio inputting plug, wherein:
   each of said bending-resistant electroluminescent wires comprises: a plurality of central electrodes which are made of enameled copper wires; a luminescent layer coated on outer surfaces of said central electrodes; a fluorescent carbon quantum dot layer and a transparent conductive layer which are coated on an outer surface of said luminescent layer; an outer electrode made of a plurality of copper wires, arranged on an outer surface of said transparent conductive layer; and a transparent plastic covering said transparent conductive layer and said outer electrode;
   said bending-resistant electroluminescent wire is parallel with an earphone audio wire or coils around an outer surface of said earphone audio wire;
   a colored transparent plastic covers said bending-resistant electroluminescent wire and said earphone audio wire to form said earphone wire having said bending-resistant electroluminescent wire;
   said electroluminescent wire driver is independent of said earphone audio wire or combined with said earphone audio wire to control said bending-resistant electroluminescent wire to flash;
   said electroluminescent wire driver comprises an inductive driver which has an outputting voltage of 50-200V and a frequency of 400-6000 Hz;
   an output of said inductive driver is controlled by multiple channels or a single channel;
   said inductive driver is connected with said bending-resistant electroluminescent wires; and
   said inductive driver adjusts a luminescent intensity and a flashing speed of said bending-resistant electroluminescent wires according to an earphone audio signal.

2. The electroluminescent earphone, as recited in claim 1, wherein:
   said audio inputting plug is connected with said electroluminescent wire driver through said earphone wire having said bending-resistant electroluminescent wire;
   said fluorescent carbon quantum dot layer is made of fluorescent nano materials containing carbon, wherein said fluorescent carbon quantum dot layer has a light absorption range of 365-520 nm and a light emission range of 440-610 nm; and
   said fluorescent carbon quantum dot layer converts a luminescent spectrum of said luminescent layer into white light.

3. The electroluminescent earphone, as recited in claim 1, wherein:
   said earbuds are connected with said electroluminescent wire driver through said earphone wires having said bending-resistant electroluminescent wires;
   each of said earphone wires comprises said bending-resistant electroluminescent wire with a single color, a plurality of said bending-resistant electroluminescent wires with said single color, or said plurality of said bending-resistant electroluminescent wires with multiple colors; and
   said luminescent layer of said bending-resistant electroluminescent wire is combined by electroluminescent fluorescent materials and fluorescent carbon quantum dots.

4. The electroluminescent earphone, as recited in claim 1, wherein:
   said electroluminescent wire driver comprises a micro charging battery and an exclusive driving control circuit;
   an anti-interferential shielding reflection layer is arranged outside said earphone audio wire;
   said micro charging battery is able to be charged by a mobile phone or a USB interface power supply;
   said electroluminescent wire driver controls said bending-resistant electroluminescent wires to flash according to an audio; and
   a color of said bending-resistant electroluminescent wire is controlled by said colored transparent plastic.

* * * * *